United States Patent [19]

Gugumus et al.

[11] Patent Number: 5,028,645

[45] Date of Patent: Jul. 2, 1991

[54] THERMOPLASTICS STABLIZED AGAINST THE ACTION OF LIGHT

[75] Inventors: Francois Gugumus, Allschwil; Jean Rody, Riehen, both of Switzerland

[73] Assignees: Ciba-Geigy Corp., Ardsley, N.Y.; Sankyo Company Ltd., Tokyo, Japan

[21] Appl. No.: 391,656

[22] Filed: Aug. 8, 1989

Related U.S. Application Data

[63] Continuation of Ser. No. 39,040, Apr. 16, 1987, abandoned.

[30] Foreign Application Priority Data

Apr. 25, 1986 [CH] Switzerland ........................ 1690/86

[51] Int. Cl.$^5$ ............................................ C08K 5/3435
[52] U.S. Cl. .................................... 524/102; 524/100; 524/126; 524/128; 524/133; 524/147; 524/323; 524/394
[58] Field of Search ............... 524/102, 100, 126, 128, 524/133, 147, 323, 394

[56] References Cited

U.S. PATENT DOCUMENTS

| | | | |
|---|---|---|---|
| 3,640,928 | 2/1972 | Murayama et al. | 524/102 |
| 3,840,494 | 10/1974 | Murayama et al. | 524/102 |
| 4,021,432 | 5/1977 | Holt et al. | 524/102 |
| 4,104,248 | 8/1978 | Cantatore | 524/102 |
| 4,203,890 | 5/1980 | Ramey et al. | 524/102 |
| 4,520,171 | 5/1985 | Diveley William et al. | 525/279 |

FOREIGN PATENT DOCUMENTS 53-65418 6/2978 Japan .

OTHER PUBLICATIONS

Abstract 77-69071y/39=(Swiss Patent No. 628,331).
Chem. Abst. 86, 19135f (1977).
Chem. Abst. 89, 181157n (1978).

*Primary Examiner*—Kriellion Morgan
*Attorney, Agent, or Firm*—JoAnn Villamizar

[57] ABSTRACT

Di-(2,2,6,6-tetramethyl-4-piperidinyl) succinate and glutarate are very effective light stabilizers for thermoplastics, particularly for polyolefins.

7 Claims, No Drawings

THERMOPLASTICS STABILIZED AGAINST THE ACTION OF LIGHT

This application is a continuation of application Ser. No. 039,040, filed Apr. 16, 1987.

The invention relates to thermoplastics, in particular polyolefins, which have been stabilized against the action of light. The stabilization is effected in this case by adding the succinic acid ester or glutaric acid ester of 2,2,6,6-tetramethylpiperidin-4-ol.

It is known that most thermoplastics are damaged by the action of light, in which respect the short-wave component (UV) of light is particularly prominent. Damage by light is particularly severe in the case of polyolefins, especially in the case of polypropylene. Polymers of this type must be stabilized against the action of light for external uses. Nowadays a number of effective commercial light stabilizers are available for this purpose, for example hydroxybenzotriazoles, hydroxybenzophenones, nickel compounds, oxanilides or aryl benzoates. The most effective light stabilizers known today are, however, sterically hindered amines, amongst which the 2,2,6,6-tetramethylpiperidine derivatives are the best known. An example of these is di-(2,2,6,6-tetramethyl-4-piperidinyl) sebacate, which is available commercially under the name Tinuvin ®770.

It has now been found that the succinic acid ester and the glutaric acid ester of 2,2,6,6-tetramethylpiperidin-4-ol are particularly suitable for use as light stabilizers for thermoplastics. In some substrates these compounds are more effective than comparable known light stabilizers, for example than the corresponding sebacic acid esters. These compounds have the formula

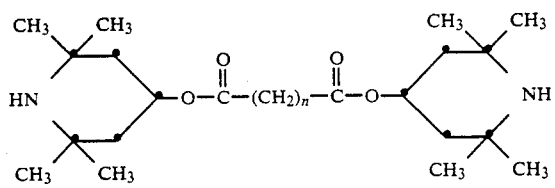

in which n is 2 or 3.

The invention therefore relates to thermoplastic polymers which have been stabilized against the action of light and contain, as the light stabilizer, di-(2,2,6,6-tetramethyl-4-piperidinyl) succinate or di-(2,2,6,6-tetramethyl-4-piperidinyl) glutarate. The polymers preferably contain the succinate (n=2).

The use of di-(2,2,6,6-tetramethyl-4-piperidinyl) succinate as a light stabilizer for synthetic rubber latices containing TiO$_2$ is suggested in Japanese Patent A-84/53545. The compound is mentioned there, but is not described in detail. Both compounds can be prepared process of U.S. application No. 3,840,494 by transesterifying 4-hydroxy-2,2,6,6-tetramethylpiperidine with a dialkyl succinate or glutarate, respectively. The homologous di-(1,2,2,6,6-pentamethyl-4-piperidinyl) succinate is also mentioned in U.S. application No. 3,840,494. Owing to its low melting point, however, this compound is not very suitable for use as a stabilizer for thermoplastic polymers. In contrast, di-(2,2,6,6-tetramethyl-4-piperidinyl) succinate melts at 118° C. and di-(2,2,6,6-tetramethyl-4-piperidinyl) glutarate melts at 83°-84° C., as a result of which dry mixing with the powdered or granulated thermoplastic polymer is possible.

The following are examples of thermoplastic polymers which can be stabilized by means of these compounds:

1. Polymers of monoolefins, for example polyethylene, polypropylene, polyisobutylene, polybut-1-ene, polymethylpent-1-ene and polymers of cycloolefins, for example those of cyclopentene or norbornene.

2. Mixtures of the polymers mentioned under 1 for example mixtures of polypropylene with polyisobutylene, with polyethylene or with EPDM.

3. Copolymers of monoolefins with one another or with other vinyl monomers, for example ethylene/propylene copolymers, propylene/but-1-ene copolymers, propylene/isobutylene copolymers, ethylene/but-1-ene copolymers, ethylene/alkyl acrylate copolymers, ethylene/alkyl methacrylate copolymers, ethylene/vinyl acetate copolymers or ethylene/acrylic acid copolymers and salts thereof (ionomers).

4. Polystyrene, poly-(p-methylstyrene) and styrene copolymers with other vinyl monomers, for example styrene/acrylonitrile, styrene/alkyl methacrylate, styrene/maleic anhydride and styrene/acrylonitrile/-methacrylate.

5. Polymers containing halogens, for example polychloroprene, chlorinated rubber, chlorinated or chlorosulfonated polyethylene, epichlorohydrin homopolymers and copolymers, and especially polymers formed from vinyl compounds containing halogens, for example polyvinyl chloride, polyvinylidene chloride, polyvinyl fluoride and polyvinylidene fluoride; and also copolymers thereof, such as vinyl chloride/vinylidene chloride, vinyl chloride/vinyl acetate or vinylidene chloride/vinyl acetate.

6. Polymers derived from α,β-unsaturated acids and derivatives thereof, such as polyacrylates and polymethacrylates, polyacrylamides and polyacrylonitriles.

7. Copolymers of the monomers mentioned under 6 with one another or with other unsaturated monomers, for example acrylonitrile/alkyl acrylate copolymers, acrylonitrile/alkoxyalkyl acrylate copolymers or acrylonitrile/vinyl halide copolymers.

8. Polymers derived from unsaturated alcohols and amines or acyl derivatives or acetals thereof, such as polyvinyl alcohol, polyvinyl acetate, stearate, benzoate or maleate, polyvinyl butyral, polyallyl phthalate and polyallylmelamine.

9. Homopolymers and copolymers of cyclic ethers, such as polyalkylene glycols, polyethylene oxide or polypropylene oxide, or copolymers thereof with bisglycidyl ethers.

10. Polyacetals, such as polyoxymethylene, and polyoxymethylenes containing comonomers, for example ethylene oxide.

11. Polyphenyl oxides and sulfides and mixtures thereof with styrene polymers.

12. Polyurethanes derived, on the one hand, from polyethers or polyesters containing terminal hydroxyl groups and, on the other hand, from aliphatic or aromatic polyisocyanates, and also precursors thereof.

13. Polyamides and copolyamides derived from diamines and dicarboxylic acids and/or from aminocarboxylic acids or the corresponding lactams, such as polyamide 4, polyamide 6, polyamide 6/6, polyamide 6/10, polyamide 11, polyamide 12, poly-2,4,4-trimethylhexamethyleneterephthalamide or poly-m-phenyleneisophthalamide and block copolymers thereof with polyethers, for example polyethylene glycol, polypropylene glycol or polytetramethylene glycol.

14. Polyureas, polyimides, polyamide-imides and polybenzimidazoles.

15. Polyesters derived from dicarboxylic acids and dialcohols and/or from hydroxycarboxylic acids or the corresponding lactones, such as polyethyleneterephthalate, polybutyleneterephthalate, poly-1,4-dimethylolcyclohexane terephthalate, polyhydroxybenzoates and block polyether-esters derived from polyethers containing hydroxyl end groups.

16. Polycarbonates and polyester-carbonates.

17. Polysulfones, polyether-sulfones and polyetherketones.

The stabilization of polyolefins and olefin copolymers such as are enumerated above under 1–3 is of particular importance, especially, however, the stabilization of polypropylene and propylene copolymers. The amount of light stabilizer added is appropriately 0.01 to 5% by weight, preferably 0.025 to 2% by weight, relative to the polymer to be stabilized.

Additions can be carried out before, during or after polymerization, but before or during shaping. The stabilizer can, for example, be mixed with the polymers in powder form or can be added to the melt of the polymer by methods customary for this purpose. The stabilizer can also be mixed in in the form of a master-batch containing, for example, 5–25% of the stabilizer.

In addition to the stabilizer according to the invention, it is also possible to add other known stabilizers to the polymer. The following classes of stabilizers are examples of these:

1. Antioxidants 1.1. Alkylated monophenols, for example 2,6-ditert.-butyl-4-methylphenol, 2-tert.-butyl-4,6-dimethylphenol, 2,6-ditert.-butyl-4-ethylphenol, 2,6-ditert.-butyl-4-n-butylphenol, 2,6-ditert.-butyl-4-i-butylphenol, 2,6-dicyclopentyl-4-methylphenol, 2-(α-methylcyclohexyl)-4,6dimethylphenol, 2,6-di-octadecyl-4-methylphenol, 2,4,6-tricyclohexylphenol or 2,6-ditert.-butyl-4-methoxymethylphenol.

1.2. Alkylated hydroquinones, for example 2,6-ditert.-butyl-4-methoxyphenol, 2,5-ditert.-butylhydroquinone, 2,5ditert.amylhydroquinone or 2,6-diphenyl-4-octadecyloxyphenol.

1.3. Hydroxylated thiodiphenyl ethers, for example 2,2′-thiobis-(6-tert.butyl-4-methylphenol), 2,2′-thiobis-(4-octylphenol), 4,4′-thiobis-(6-tert.-butyl-3-methylphenol) or 4,4′-thiobis-(6-tert.butyl-2-methylphenol).

1.4. Alkylidene bisphenols, for example 2,2′-methylenebis-(6-tert.butyl-4-methylphenol), 2,2′-methylenebis-(6-tert.butyl-4-ethylphenol), 2,2′-methylenebis-[4-methyl-6-(α-methylcyclohexyl)-phenol], 2,2′-methylenebis-(4-methyl-6-cyclohexylphenol), 2,2′-methylenebis-(6-nonyl-4-methylphenol), 2,2′-methylenebis-(4,6-ditert.butylphenol), 2,2′-ethylidenebis-(4,6-ditert.butylphenol), 2,2′-ethylidenebis-(6-tert.butyl-4-isobutylphenol), 2,2′-methylenebis-[6-(α-methylbenzyl)-4-nonylphenol], 2.2′-methylenebis-[6-(α,α dimethylbenzyl)-4-nonylphenol], 4,4′-methylenebis-(2,6-ditert.butylphenol), 4,4′-methylenebis-(6-tert.butyl-2-methylphenol), 1,1-bis-(5-tert.butyl-4-hydroxy-2-methylphenyl)-butane, 2,6-di-(3-tert.butyl-5-methyl-2-hydroxybenzyl)-4-methylphenol, 1,1,3-tris-(5-tert.butyl-4-hydroxy-2-methylphenyl)-butane, 1,1-bis-(5-tert.butyl-4-hydroxy-2-methylphenyl)-3-n-dodecylmercaptobutane, ethylene glycol bis-[3,3-bis-(3′-tert.butyl-4′-hydroxyphenyl)-butyrate], di-(3-tert.-butyl-4-hydroxy-5-methylphenyl)-dicyclopentadiene or di-[2-(3′-tert.butyl-2′-hydroxy-5′-methylbenzyl)-6-tert.butyl-4methylphenyl] terephthalate.

1.5. Benzyl compounds, for example 1,3,5-tri-(3,5-ditert.-butyl-4-hydroxybenzyl)-2,4,6-trimethylbenzene, di-(3,5-ditert.butyl-4-hydroxybenzyl)-sulfide, isooctyl 3,5-ditert.-butyl-4-hydroxybenzylmercaptoacetate, bis-(4-tert.butyl-3-hydroxy-2,6-dimethylbenzyl)-dithiol terephthalate, 1,3,5-tris-(3,5-ditert.butyl-4-hydroxybenzyl) isocyanurate, 1,3,5-tris-(4-tert.butyl-3-hydroxy-2,6-dimethylbenzyl) isocyanurate, dioctadecyl 3,5-ditert.butyl-4-hydroxybenzylphosphonate or the calcium salt of monoethyl 3,5-ditert.butyl-4hydroxybenzylphosphonate.

1.6. Acylaminophenols, for example 4-hydroxylauranilide, 4-hydroxystearanilide, 2,4-bisoctylmercapto-6-(3,5-ditert.-butyl-4-hydroxyanilino)-s-triazine or octyl N-(3,5-ditert.-butyl-4-hydroxyphenyl)-carbamate.

1.7. Esters of β-(3,5-ditert.butyl-4-hydroxyphenyl)-propionic acid with monohydric or polyhydric alcohols, for example with methanol, octadecanol, 1,6-hexanediol, neopentylglycol, thiodiethylene glycol, diethylene glycol, triethylene glycol, pentaerythritol, trishydroxyethyl isocyanurate or dihydroxyethyloxamide.

1.8. Esters of β-(5-tert.butyl-4-hydroxy-3-methylphenyl)-propionic acid with monohydric or polyhydric alcohols, for example with methanol, octadecanol, 1,6-hexanediol, neopentylglycol, thiodiethylene glycol, diethylene glycol, triethylene glycol, pentaerythritol, trishydroxyethyl isocyanurate or dihydroxyethyloxamide.

1.9. Amides of β-(3,5-ditert.butyl-4-hydroxyphenyl)-propionic acid, for example N,N′-di-(3,5-ditert.butyl-4-hydroxyphenylpropionyl)-hexamethylenediamine, N,N′-di-(3,5-ditert.-butyl-4-hydroxyphenylpropionyl)-trimethylenediamine or N,N′-di-(3,5-ditert.butyl-4-hydroxyphenylpropionyl)-hydrazine.

2. UV Absorbers and Light Stabilizers 2.1. 2-(2′-Hydroxyphenyl)-benzotriazols, for example the 5′-methyl-, 3′,5′-ditert.butyl-, 5′-tert.butyl-, 5′-(1,1,3,3-tetramethylbutyl)-, 5-chloro-3′,5′-ditert.butyl-, 5-chloro-3′-tert.butyl-5′-methyl-, 3′-sec.butyl-5′-tert.butyl-, 4′-octoxy-, 3′, 5′-ditert.amyl- or 3′, 5′-bis-(α,α-dimethylbenzyl)-derivative.

2.2. 2-Hydroxybenzophenones, for example the 4-hydroxy-,4-methoxy-, 4-octoxy-, 4-decyloxy-, 4-dodecyloxy-, 4-benzyloxy-, 4,2′,4′-trihydroxy- or 2′-hydroxy-4,4′-dimethoxyderivative.

2.3. Esters of substituted or unsubstituted benzoic acids, for example 4-tert.butylphenyl salicylate, phenyl salicylate, octylphenyl salicylate, dibenzoylresorcinol, bis-(4-tert.butylbenzoyl)-resorcinol, benzoylresorcinol, 2,4-ditert.butylphenyl 3,5-ditert.butyl-4-hydroxybenzoate or hexadecyl 3,5-ditert.butyl-4-hydroxybenzoate.

2.4. Acrylates, for example ethyl or isooctyl α-cyano-β-β-diphenylacrylate, methyl α-carbomethoxycinnamate, ethyl or butyl α-cyano-β-methyl-p-methoxycinnamate, methyl α-carbomethoxy-p-methoxycinnamate or N-(β-carbomethoxy-β-cyanovinyl)-2-methylindoline.

2.5. Nickel compounds, for example nickel complexes of 2,2′-thiobis-[4-(1,1,3,3-tetramethylbutyl)-phenol], such as the 1:1 or the 1:2 complex, if appropriate containing additional ligands, such as n-butylamine, triethanolamine or N-cyclohexyldiethanolamine, nickel dibutyldithiocarbamate, nickel salts of monoalkyl 4-hydroxy-3,5-ditert.butylbenzylphosphonates, such as the methyl or ethyl ester, nickel complexes of ketoximes, such as 2-hydroxy-4-methylphenyl undecyl ketone oxime, or nickel complexes of 1-phenyl-4-lauroyl-5-hydroxypyrazole, if appropriate containing additional ligands.

2.6. Sterically hindered amines, for example bis-(2,2,6,6-tetramethylpiperidyl) sebacate, bis-(1,2,2,6,6-pentamethylpiperidyl) sebacate, bis-(1,2,2,6,6-pentamethylpiperidyl) n-butyl-3,5-ditert.butyl-4-hydroxybenzylmalonate, tris-(2,2,6,6-tetramethyl-4-piperidyl) nitrilotriacetate, tetrakis-(2,2,6,6-tetramethyl-4-piperidyl) 1,2,3,4-butanetetracarboxylate or 1,1'-(1,2-ethanediyl)-bis-(3,3,5,5-tetramethylpiperazinone).

2.7. Oxamides, for example 4,4'-dioctyloxyoxanilide, 2,2'-dioctyloxy-5,5'-ditert.butyloxanilide, 2,2'-didodecyloxy-5,5'-ditert.butyloxanilide, 2-ethoxy-2'-ethyloxanilide, N,N'-bis-(3-dimethylaminopropyl)-oxamide, 2-ethoxy-5-tert.-butyl-2'-ethyloxamide and a mixture thereof with 2-ethoxy-2'-ethyl-5,4'-ditert.butyloxanilide and mixtures of o-methoxy-substituted and p-methoxy-substituted and of o-ethoxy-disubstituted and p-ethoxy-disubstituted oxanilides.

3. Metal deactivators, for example N,N'-diphenyloxamide, N-salicylal-N'-salicyloylhydrazine, N,N'-bis-salicyloylhydrazine, N,N'-bis-(3,5-ditert.butyl-4-hydroxyphenylpropionyl)-hydrazine, 3-salicyloylamino-1,2,4-triazole or bisbenzylideneoxalic acid dihydrazide.

4. Phosphites and phosphonites, for example triphenyl phosphite, diphenyl alkyl phosphites, phenyl dialkyl phosphites, tri-(nonylphenyl) phosphite, trilauryl phosphite, trioctadecyl phosphite, distearyl pentaerythrityl diphosphite, tris-(2,4-ditert.butylphenyl) phosphite, diisodecyl pentaerythrityl diphosphite, di-(2,4-ditert.butylphenyl) pentaerythrityl diphosphite, tristearyl sorbitol triphosphite, tetrakis-(2,4-ditert.butylphenyl) 4,4'-biphenylenediphosphonite or 3,9-bis-(2,4-ditert.butylphenoxy)-2,4,8,10-tetraoxa-3,9-diphosphaspiro[5.5]undecane. 5. Compounds which destroy peroxides, for example esters of β-thiodipropionic acid, for example the lauryl, stearyl, myristyl or tridecyl ester, mercaptobenzimidazole, the zinc salt of 2-mercaptobenzimidazole, zinc dibutyldithiocarbamate, dioctadecyl disulfide or pentaerythrityl tetrakis-(β-dodecylmercapto)-propionate.

6. Polyamide stabilizers, for example copper salts in combination with iodides and/or phosphorus compounds and salts of divalent manganese.

7. Basic co-stabilizers, for example melamine, polyvinylpyrrolidone, dicyandiamide, triallyl cyanurate, urea derivatives, hydrazine derivatives, amines, polyamides, polyurethanes, alkali and alkaline earth metal salts of higher fatty acids, for example Ca stearate, Zn stearate, Mg stearate, Na ricinoleate or K palmitate, antimony pyrocatecholate or tin pyrocatecholate.

The concomitant use of known stabilizers can result in particularly advantageous stabilizing effects, which is particularly the case when UV absorbers and/or phenolic antioxidants are concomitantly used. The concomitant use of phenolic antioxidants, of phosphites or phosphonites and of alkaline earth metal salts of higher fatty acids is of particular importance in the stabilization of polyolefins. Similarly, the amount of the various cos-tabilizers added is appropriately 0.01 to 5% by weight, preferably 0.025 to 2% by weight, relative to the polymer.

It is also possible to add other additives which are customary in plastics technology, for example pigments, fillers, reinforcing agents, lubricants, flame-retarding agents, antistatic agents, blowing agents or plasticizers.

The plastics thus stabilized can be used in a very wide variety of forms, for example as films, fibres, tapes, sheets, containers, tubes or other profiles.

The following examples describe the preparation of the compounds mentioned and their use in thermoplastics. In these examples, parts and % are by weight, unless stated otherwise.

EXAMPLE 1

Preparation of di-(2,2,6,6-tetramethyl-4-piperidinyl) succinate.

322.3 g (2.05 mol) of 4-hydroxy-2,2,6,6-tetramethyl-piperidine and 146.1 g (1 mol) of dimethyl succinate in 300 ml of xylene are heated to 80° C. 1.2 g of lithium amide are added to the reaction mixture at this temperature, and the temperature is raised to 120°–125° C. A mixture of methanol and xylene is then distilled off slowly under a slow stream of nitrogen. After approx. 10 hours virtually no more methanol distills off, which indicates the end of the transesterification. The contents of the flask are diluted with 500 ml of petroleum ether (boiling range 110°–140° C.) and are washed in the separating funnel while still warm (60°–70° C.) with three times 100 ml of water. The reaction product crystallizes from the organic phase on cooling as colourless crystals. The di-(2,2,6,6-tetramethyl-4-piperidinyl) succinate obtained melts at 118° C.

EXAMPLE 2

Preparation of di-(2,2,6,6-tetramethyl-4-piperidinyl) glutarate.

The procedure is as in Example 1, using 160.2 g (1 mol) of dimethyl glutarate instead of the succinic acid ester. The crude product (residue from evaporation of the organic phase) is crystallized from 1200 ml of petroleum ether, boiling range 110°–140° C. The crystals melt at 83°–84° C.

EXAMPLE 3

Light stabilizing action in polypropylene tapes.

100 parts of polypropylene powder [melt index 2.4 g/10 minutes (230° C., 2160 g)] are mixed in a drum mixer with 0.05 part of pentaerythrityl tetrakis-[β-(3,5-ditert.-butyl-4-hydroxyphenyl)-propionate], 0.05 part of tris-(2,4-ditert.butylphenyl) phosphite, 0.1 part of Ca stearate and 0.05 part of the light stabilizer, and are then granulated in an extruder at a temperature of 180° to 220° C.

The resulting granules are processed in a second extruder equipped with a sheeting die (temperature 220° to 260° C.) to give a film, which is cut into tapes, which are then stretched in a ratio of 1:6 at an elevated temperature and are wound up (titer of the tapes: 700 to 900 den; ultimate tensile strength: 5.5 to 6.5 g/den).

The polypropylene tapes thus prepared are mounted on sample carriers without tension and are exposed to light in a Weather-O-Meter WRC 600. Groups of 5 specimens are taken out after various times and their ultimate tensile strength is determined. The exposure time after which the ultimate tensile strength of the tapes has deteriorated to 50% of the starting value is taken as a measure of the protective action of the various light stabilizers. The values obtained are listed in Table 1.

TABLE 1

| Light stabilizer | Exposure time until ultimate tensile strength is 50% |
| --- | --- |
| none | 560 hours |
| 0.05% of di-(2,2,6,6-tetramethyl-4-piperidinyl) succinate | 2820 hours |

EXAMPLE 4

Light stabilization of polypropylene tapes

The procedure is as in Example 3, but the polypropylene tapes are exposed in a Weather-O-Meter Ci 65 at a black-panel temperature of 63°±3° C.

TABLE 2

| Light stabilizer | Exposure time until ultimate tensile strength is 50% |
| --- | --- |
| none | 560 hours |
| 0.05% of di-(2,2,6,6-tetramethyl-4-piperidinyl) glutarate | >1400 hours |

EXAMPLE 5

Light stabilizing action in small polypropylene injection-moulded sheets 2 mm thick.

100 parts of polypropylene powder [melt index 2.4 g/10 minutes (230° C./2160 g)] are mixed in a drum mixer with 0.05 part of pentaerythrityl tetrakis-[β-(3,5-ditert.butyl-4-hydroxyphenyl)-propionate], 0.05 part of tris-(2,4-ditert.butylphenyl) phosphite, 0.1 part of Ca stearate, 0.1 part of phthalocyanine blue and 0.2 part of light stabilizer, and are then granulated in an extruder at a temperature of 200° to 220° C.

The resulting granules are injection-moulded, at a temperature of 190° to 220° C., in an injection-moulding machine to give small sheets 2 mm thick.

The small polypropylene sheets thus prepared are exposed to light in a Weather-O-Meter 65 WR at a blackpanel temperature of 63°±3° C. (ASTM G 26-77). The samples are examined visually for chalking at regular intervals. The exposure time up to incipient chalking is taken as a measure of the protective action of the various light stabilizers. The results are shown in Table 3.

TABLE 3

| Light stabilizer (0.2%) | Exposure time up to incipient chalking |
| --- | --- |
| Di-(2,2,6,6-tetramethyl-piperidin-4-yl) succinate | 6100 hours |
| none | 510 hours |

EXAMPLE 6

Light stabilization of small polypropylene injection-moulded sheets.

The procedure is as in Example 5, but only 0.05 part of phthalocyanine blue and only 0.05 part of light stabilizer are used for 100 parts of polypropylene. Processing to give small sheets is carried out in an injection-moulding machine at 250°–260° C. The small sheets are exposed in a Weather-O-Meter Ci 65. Assessment is carried out as in Example 5.

TABLE 4

| Light stabilizer | Exposure time up to incipient chalking |
| --- | --- |
| 0.05% of di-(2,2,6,6-tetramethyl-4-piperidinyl) glutarate | >1400 hours |
| none | 475 hours |

What is claimed is:

1. A polyolefins or olefin copolymers which has been stabilized against the action of light and contains, as the light stabilizer, di-(2,2,6,6-tetramethyl-4-piperidinyl) succinate.

2. A stabilized polypropylene or propylene copolymer according to claim 1.

3. A stabilized polymer according to claim 1, containing 0.01 to 5% by weight of light stabilizer, relative to the polymer.

4. A stabilized polymer according to claim 1, containing 0.025 to 2% by weight of light stabilizer, relative to the polymer.

5. A stabilized polymer according to claim 1, containing a UV absorber as well as the light stabilizer.

6. A stabilized polymer according to claim 6, containing a UV absorber and an antioxidant as well as the light stabilizer.

7. A stabilized polyolefin according to claim 1, containing a phenolic antioxidant, a phosphite or phosphonite and an alkaline earth metal salt of a higher fatty acid as well as the light stabilizer.

* * * * *